United States Patent [19]

Nossen

[11] Patent Number: 4,485,477
[45] Date of Patent: Nov. 27, 1984

[54] FAST FREQUENCY/CODE SEARCH

[75] Inventor: Edward J. Nossen, Cherry Hill, N.J.

[73] Assignee: RCA Corporation, New York, N.Y.

[21] Appl. No.: 399,879

[22] Filed: Jul. 19, 1982

[51] Int. Cl.³ .......................................... H04B 15/00
[52] U.S. Cl. ...................................... 375/1; 364/728; 375/96; 375/97
[58] Field of Search .............. 364/604, 724, 728, 819; 343/5 AF, 5 PN; 375/1, 96, 97; 455/257

[56] References Cited

U.S. PATENT DOCUMENTS

| | | | |
|---|---|---|---|
| 3,868,686 | 2/1975 | Magorian | 343/5 PN |
| 4,042,925 | 8/1977 | Albanese et al. | 343/5 PN |
| 4,328,588 | 5/1982 | Smithson | 375/96 |
| 4,418,393 | 11/1983 | Zscheile, Jr. | 375/1 |

Primary Examiner—Benedict V. Safourek
Attorney, Agent, or Firm—Joseph S. Tripoli; Donald W. Phillion

[57] ABSTRACT

A decoder for decoding received pseudo random sequence (PRS) codes modulated upon a carrier signal and having an original chip rate $f_c$, and for correcting for unknown frequency shifts in the received PRS codes. The decoder includes a local oscillator for demodulating the carrier signal and detecting the received PRS codes and a signal source for generating X correction PRS codes each having a pattern of chips similar to the chip pattern of a predetermined one of the received PRS codes and each shifted in chip rate from $f_c$ by amounts which will provide a spectrum of frequencies spanning any expected frequency shift of a received PRS code. Also provided is a correlator for correlating each of the X correction PRS codes with each received PRS code at a rate $f_r$ to determine which particular correction PRS code produces the greatest correlation signal, where $f_r >> f_c$. Further logic is responsive to the chip rate of the particular correction PRS code for correcting the output frequency of the local oscillator to compensate for the unknown frequency shift during the reception of subsequently received PRS codes.

5 Claims, 4 Drawing Figures

FAST FREQUENCY/CODE SEARCH

This invention relates generally to communication systems employing a pseudo random sequence (PRS) code and more particularly, to a decoder and a decoding method in such a communication system for providing a fast search for received PRS code synchronization signals even when they have Doppler shift thereon.

One of the most common forms of modulation employed in prior art communication systems is some form of phase modulation, such as bi-phase or quadraphase, without a PRS code. When a frequency error exists between the transmitter and the receiver, due either to multi-path transmission, oscillator drift, Doppler effect, or other distortion producing phenomena, the receiver/demodulator must first search for the frequency offset before phase lock can be attempted. U.S. Pat. No. 4,291,269 entitled "System And Method For Frequency Discrimination" and issued to Nossen on Sept. 22, 1981, describes a fast search technique for frequency uncertainties due to Doppler or oscillator drift encountered in carrier or FSK systems. The techniques of the aforementioned U.S. Pat. No. 4,291,269 are also applicable to phase modulated systems where the modulation is first stripped or detected by doubling or quadrupling the frequency of the received signal.

PRS codes can be effectively employed to protect the transmission link against distortion produced by multipath or other types of interference. However, when the received signal is a modulated PRS signal employed to protect against interference, the multiplication process nullifies the protection which might otherwise be afforded by the phase coded technique.

In order to retain the protection provided by PRS coding, a search for each possible frequency offset, such as Doppler, must be performed. Possible frequency offsets employed in such a search are usually discrete frequency offsets and should be spaced sufficiently close together so that one of them will simulate the received Doppler shifted signal within a close frequency tolerance. In some prior art systems a serial search is performed which must be repeated for each of the possible frequency offsets. The foregoing implies slewing a plurality of reference PRS codes, each having a different one of the several possible frequency offsets, relative to the received signal and then determining which of the reference PRS codes produced the largest correlation pulse with the received PRS code. The frequency offset of such a reference PRS code is then the Doppler offset of the received signal. The foregoing procedure results in a signal acquisition time of several minutes. This relatively long search time can be greatly reduced if either the time or the frequency domain, or both, are searched in parallel. Matched filter correlation techniques, which exist in the prior art, make possible rapid searches in a parallel manner in the time domain. In order to search rapidly in the frequency domain, a large bank of matched filter correlators, each with an appropriate frequency offset, can be employed. Such simultaneous searching in either the time or frequency domains can be accomplished rapidly but at substantial hardware expense.

Certain definitions will now be set forth. A pseudo random sequence (PRS) is a signal made up of a number of N chips where N is usually some integral power of 2 such as 16, 32, 64, or more. A chip in a PRS code is defined as a smallest segment forming the PRS code and usually has a time period equal to the period of a cycle of the clock signal generating the PRS signal. As used herein a PRS data code is defined as a complete N chip PRS data code and excludes any chips from an adjacent PRS data code. A PRS reference code is a complete N chip reference PRS code and excludes any chips from an adjacent PRS reference code. In the present system, there are 64 PRS reference codes and 64 PRS data codes which are duplicates of each other and are employed in the correlation process at the receiver (note that PRS data codes can have undesirable frequency shift thereon which is compensated for by means to be discussed later herein). The 64 PRS data codes are generated by the use of 6-bit data symbols, each data symbol being converted to a PRS data code at a transmitter (the signal source 100).

The present invention provides structure which will perform a rapid time search of a received PRS code with far less hardware than is required by prior art structures. A basic premise of the invention is that a received PRS code with a frequency error due to Doppler shift (or from some other cause) may be viewed as distinguishable from the same PRS code without the Doppler shift even though both signals will have similar chip patterns. The Doppler shift in the received PRS codes can be recreated by combining a PRS with a tone corresponding to the frequency error caused by the Doppler effect. A whole series of such sequences, herein referred to as frequency correction reference PRS codes, or correction PRS codes for purposes of brevity, can be pre-computed at the receiver by combining the nominal transmitted PRS code with a large number of tones and storing each such new correction PRS code in a read only memory (ROM). Each of these correction PRS codes is then supplied to a correlator in rapid succession and correlated with a received PRS code to determine which correction PRS code will produce the largest correlation value. The correction PRS code which best correlates with the incoming PRS code contains a frequency offset which is equal to or close to the Doppler offset in the received PRS code.

The local oscillator of the receiver system is then altered by an appropriate amount to compensate for the Doppler shift present in the received PRS code thereby, in effect, removing the Doppler shift from subsequently received PRS codes and permitting direct correlation with the stored predetermined reference PRS code words.

In accordance with a preferred form of the invention there is provided a decoder for decoding received PRS code modulated upon a carrier signal, having an original chip rate $f_c$, and an unknown frequency shift thereon. The decoder compensates for the frequency shift to provide improved correlation of locally generated reference PRS codes of chip rate $f_c$ with the received PRS codes and comprises first logic means including a local oscillator for demodulating the received PRS codes, and a signal source for providing X correction PRS codes each having a pattern of chips similar to the chip pattern of a predetermined one of the received PRS codes and each shifted in chip rate from $f_c$ by amounts which provide a spectrum of frequencies spanning any expected frequency shift of a received PRS code. Also provided is a correlator for correlating each of the X correction PRS codes with a predetermined received PRS code at a rate $f_x$ to determine which particular correction PRS code produces the greatest correlation signal, where $f_x \gg f_c$, and other logic means responsive to the chip rate of the particular correction PRS code which corrects the frequency of the output of the local oscillator to compensate for the unknown frequency shift during the reception of subsequently received PRS codes.

Figure 1:
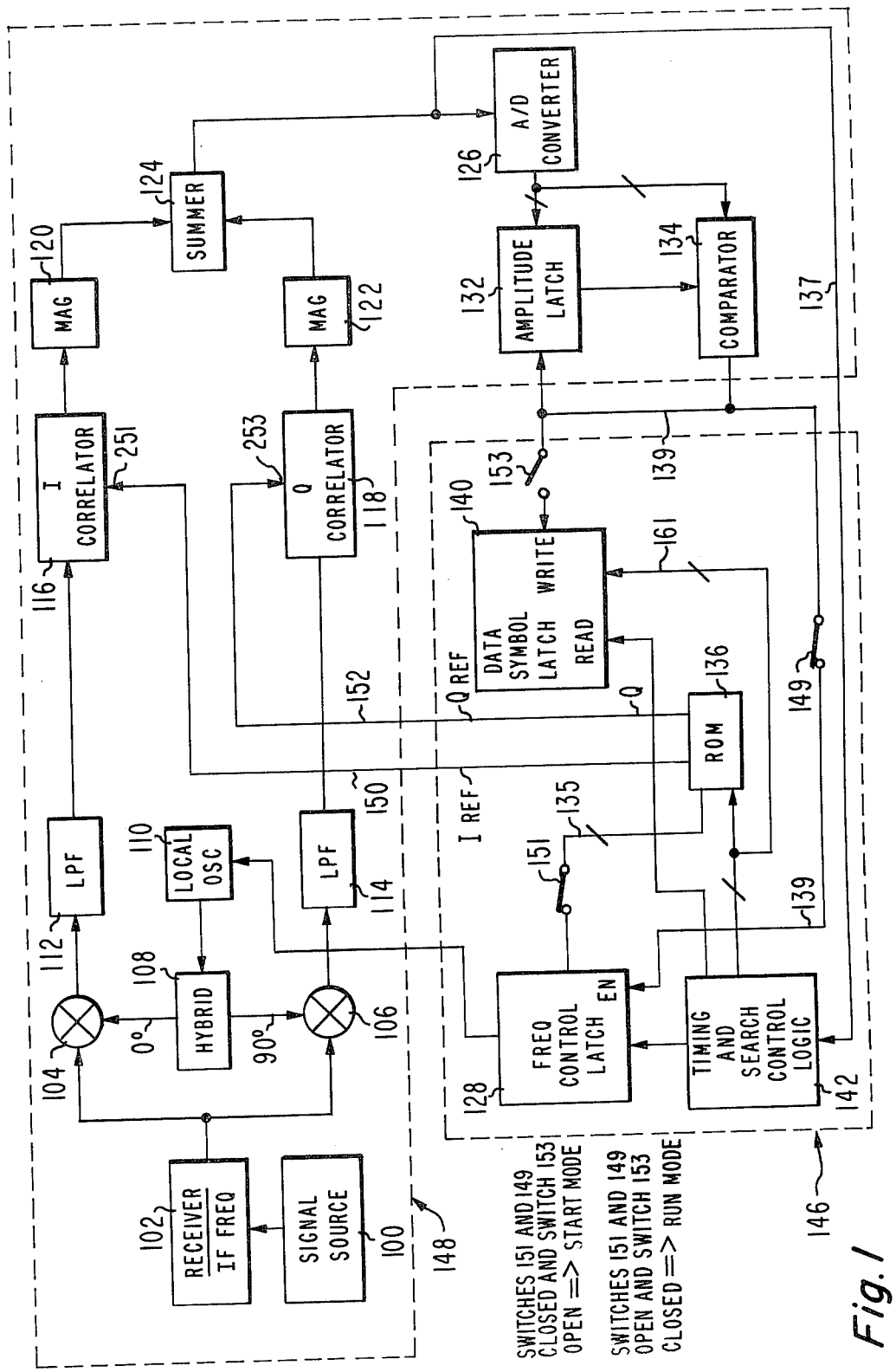
FIG. 1 shows a generalized block diagram of the invention.
Figure 2:
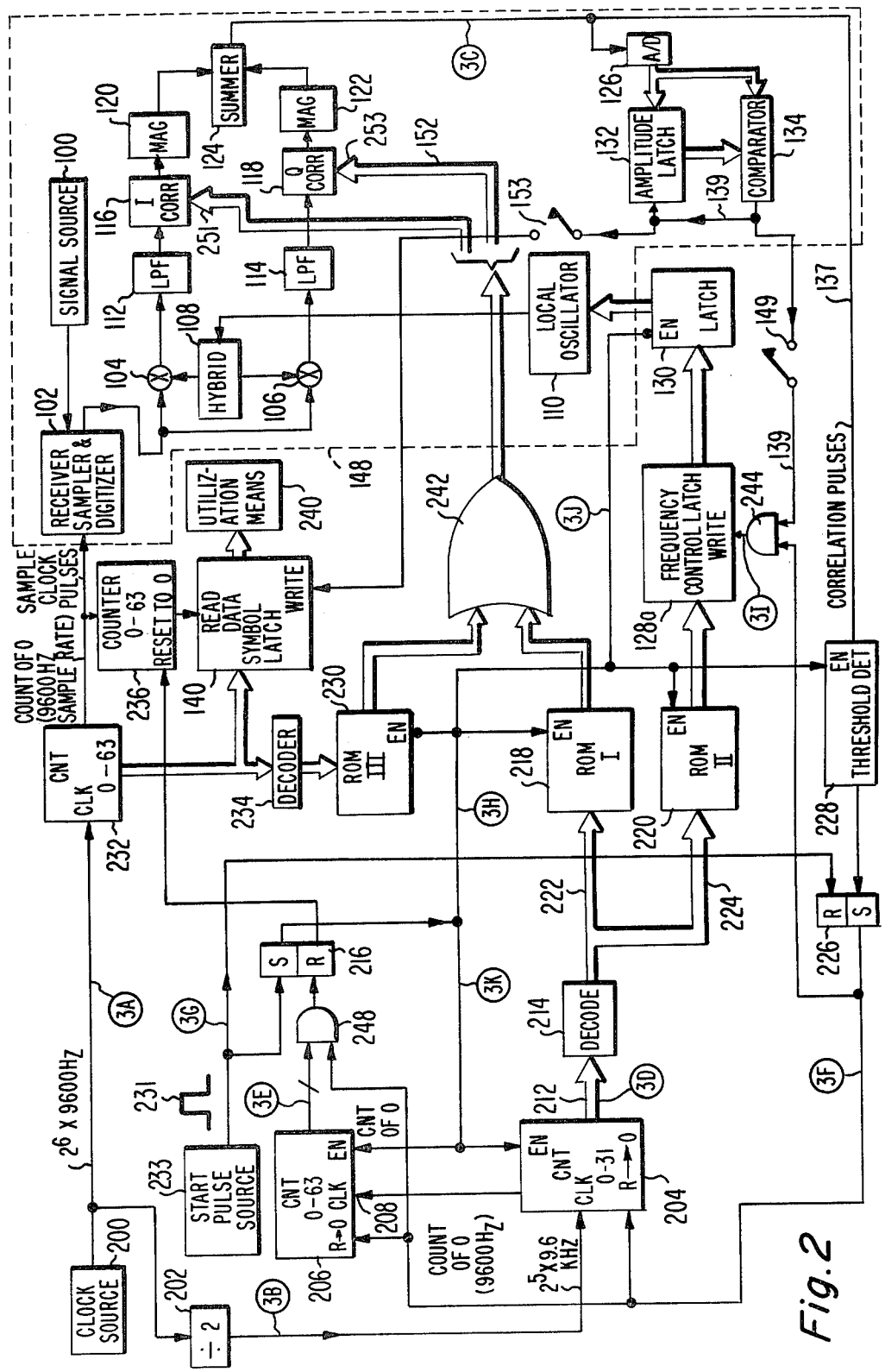
FIG. 2 shows a more detailed block diagram of the invention including the timing logic.

Referring now to FIG. 1, there is shown a somewhat generalized block diagram of the invention which is included to facilitate an understanding of the more complete block diagram of FIG. 2. In FIG. 1, a continuous stream of 64 chip PRS codes is received from signal source (e.g., a transmitter) 100 by receiver 102 which down-converts the received signal to an IF frequency and supplies such down-converted signal to mixers 104 and 106. Also supplied to mixers 104 and 106 are the quadrature outputs of hybrid circuit 108 to which is supplied the output of local oscillator 110. Ideally, local oscillator 110 is equal to the IF frequency generated in receiver 102. However, due to frequency drift or Doppler effects, the uncorrected frequency of local oscillator 110 and the IF frequency generated in receiver 102 are not equal. It is this frequency difference that the invention identifies and corrects.

The outputs of mixers 104 and 106, which now represent the demodulated or detected I and Q components of the received PRS code, are supplied to low pass filters 112 and 114, respectively, which remove undesirable high frequency components from the signal. The smoothed I and Q components of the received PRS signals are then supplied to first inputs of the I and Q correlators 116 and 118, respectively. Second input signals are supplied to the I and Q correlators 116 and 118, via leads 150 and 152 corresponding to correction PRS codes obtained from ROM 136. These I and Q correction PRS codes supplied from ROM 136 are correlated with the incoming I and Q signals from filters 112 and 114 to produce correlation output pulses whose magnitude varies in accordance with the degree of correlation. Magnitude determining circuits 120 and 122 function to determine the absolute magnitudes of the correlation pulses generated in the I and Q correlators 116 and 118 and supply such absolute magnitude signals to summer 124.

Before proceeding further with the description of the logic of FIG. 1, a general description of the principles of operation of the circuit will be helpful. The operation of the circuit is divided into two modes, a start or synchronization mode and the run of operating mode. During the start mode, with switches 149 and 151 closed and switch 153 open, the logic performs the function of determining the frequency shift, such as might be caused by the Doppler effect, in the received signal and generates a frequency correcting value which is stored in the frequency control latch 128. During the run mode such value functions to alter the frequency of local oscillator 110 so that such altered frequency is, in fact, equal to the IF frequency generated in receiver 102, thereby enabling the adjusted local oscillator 110 output to properly demodulate subsequently received IF signals from receiver 102 without the distortion that would otherwise be produced due to Doppler shift in such received signal.

Following the determination of such frequency corrective value and the storing of such value in latch 128, switches 149 and 151 are opened (and switch 153 closed) thus isolating the determined value in latch 128 and preventing further alteration by the action of the circuit. In the run mode the system will receive and properly decode subsequently received PRS signals, of which there can be 64 different ones in the described embodiment of the invention.

The ROM 136, in one form of the invention, is divided into two parts which will be discussed in more detail in connection with FIG. 2. Generally, one part of ROM 136 stores a plurality of correction PRS codes each of which are offset in frequency but which have a bit pattern similar to that of a predetermined received PRS code. More specifically, each of these plurality of correction PRS codes has been offset in frequency, one from the other, to form a spectrum of frequencies which covers the expected maximum frequency shift of the predetermined received PRS code and therefore of any of the other 63 PRS codes which are subsequently randomly received in the run mode.

After the system is initially turned on (with switches 151 and 149 closed) each of these plurality of frequency-offset correction PRS codes will be supplied in rapid succession at a rate $f_x$ to the I and Q reference inputs 251 and 253 of I and Q correlators 116 and 118. In a preferred embodiment of the invention employing 32 such offset frequencies the corresponding 32 correction PRS codes will all be supplied to I and Q correlators 116 and 118 each time a new chip is received from signal source 100 by receiver 102.

Thus, at some point in time, the predetermined received PRS signal will be received by receiver 102 and will produce increasingly larger correlation output pulses from the I and Q correlators 116 and 118 as the predetermined PRS signal becomes more fully entered into correlators 116 and 118 and ultimately occupies all 64 stages thereof. As such predetermined PRS signal begins to move out of correlators 116 and 118 the magnitude of the correlation pulses will gradually decrease.

It is to be noted that while several of the frequency shifted correction PRS code will produce identifiable correlation pulses in correlators 116 and 118 the particular correction PRS code whose frequency shift is, in fact, equal to or very nearly equal to the Doppler shift in the received signal will produce the greatest correlation pulse in correlators 116 and 118.

As mentioned above, these correlation pulses produced by I and Q correlators 116 and 118 are processed by magnitude determining circuits 120 and 122 and then supplied to summer 124. The output from summer 124 is supplied to A/D converter 126 which, in turn, supplies a digitized form of the output of summer 124 both to amplitude latch 132 and to comparator 134. Amplitude latch 132 and comparator 134 act together to store the last largest received correlation pulse (digitized) from A/D converter 126, and, when an even larger digitized pulse is received, to replace such last largest pulse with the subsequently received larger digitized pulse from A/D converter 126. More specifically, as each digitized output word from A/D converter 126 is supplied to comparator 134 it is compared with the magnitude of the word already stored in amplitude latch 132. If the magnitude of the new word supplied to comparator 134 is larger than the stored in latch 132, then latch 132 is enabled via lead 139 to store therein the new digitized value supplied from A/D converter 126.

At the same time the signal appearing on lead 139 enables frequency control latch 128 through closed switch 149 which responds thereto to store a value supplied from ROM 136 via bus 135 and closed switch 151. This value is eventually employed to alter the frequency of local oscillator 110 by an amount equal to the frequency offset of the particular correction PRS code which generated the largest pulse stored in latch 132. The foregoing assumes the start mode with switches 151 and 149 closed and switch 153 open.

By virtue of logic contained in timing and search control logic 142 and the amplitude latch 132 the frequency control latch 128 will store successive values over a period of time equal to the reception of 64 code chips by receiver 102 measured from the generation of a correlation pulse at the output of summer 124 which exceeds a certain threshold value, thereby ensuring that offset frequency correction PRS codes will be compared with the received predetermined PRS signal at a time when said predetermined PRS code completely occupies the 16 stages of the I and Q correlators 116 and 118.

At the end of such period of time the frequency control latch 128 will thus contain that value which corresponds to the frequency offset correction PRS code which produced the largest correlation output pulses from I and Q correlators 116 and 118. Accordingly, at the end of such period of time the timing and search control logic 142 will open switches 151 and 149 and close switch 153, thereby disconnecting the first portion of ROM 136 from frequency control latch 128 and connecting another portion of ROM 136 to correlators 116 and 118 and also switching the system to its run mode. The opening of switch 151 prevents further changes in the frequency output of local oscillator 110 from occurring.

In the run mode amplitude latch 132 and comparator 134 will function in the same manner as they did in the start mode except that latch 132 will store the last largest received correlation pulse created by the correlation of any received PRS data code, which can be any one of the 64 possible PRS data codes, and the 64 reference PRS codes (with no frequency offsets) stored in the second part of ROM 136. Such 64 reference PRS signals are supplied in rapid sequence to the second inputs of I and Q correlators 116 and 118 each time a new chip is received by the receiver 102 and entered into the I and Q correlators, after demodulation, as discussed above.

The data symbol code latch logic 140 responds to each new correlation value stored in latch 132 by virtue of an output signal appearing on lead 139 from comparator 134, as discussed above, to store therein a unique word identifying each particular reference PRS code which produced such latest largest correlation pulse. More specifically, data symbol latch logic 140 receives such identifying words from the output of control logic 142 which addresses ROM 136. The encoding scheme employed in the system is designed so that the address of a memory location in ROM 136 during the run mode is, in fact, the corresponding data symbol. Thus, the address of the memory location in ROM 136 containing the reference PRS code corresponding to the largest correlation pulse is the desired data symbol output.

Referring now to FIG. 2 there is shown a more detailed combined block and logic diagram of the invention which will be discussed with the aid of the timing waveforms of FIGS. 3 and 4.

Figure 3:
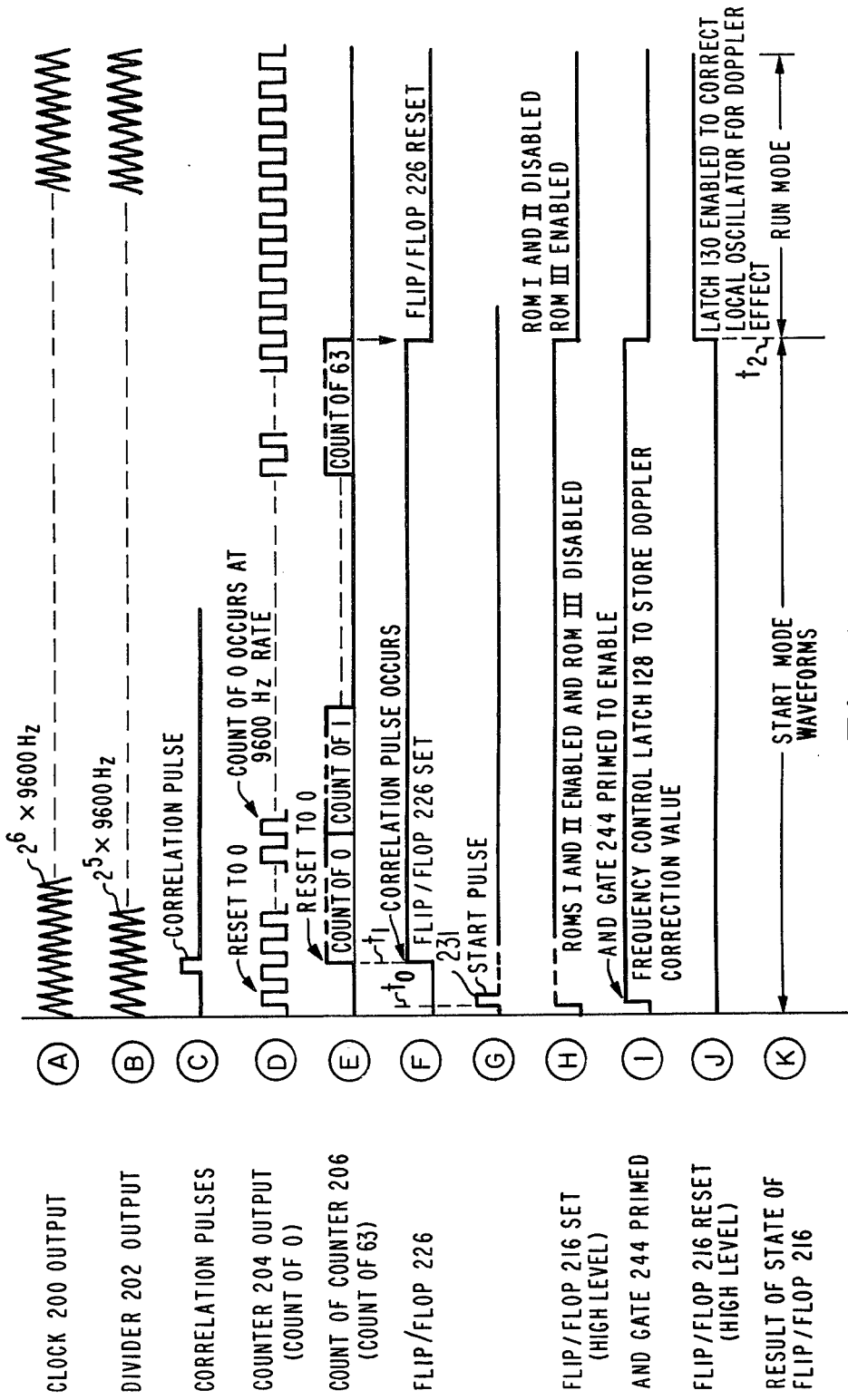
FIG. 3 is a set of timing waveforms to facilitate an understanding of the start mode of operation of the structure of FIG. 2.
Figure 4:
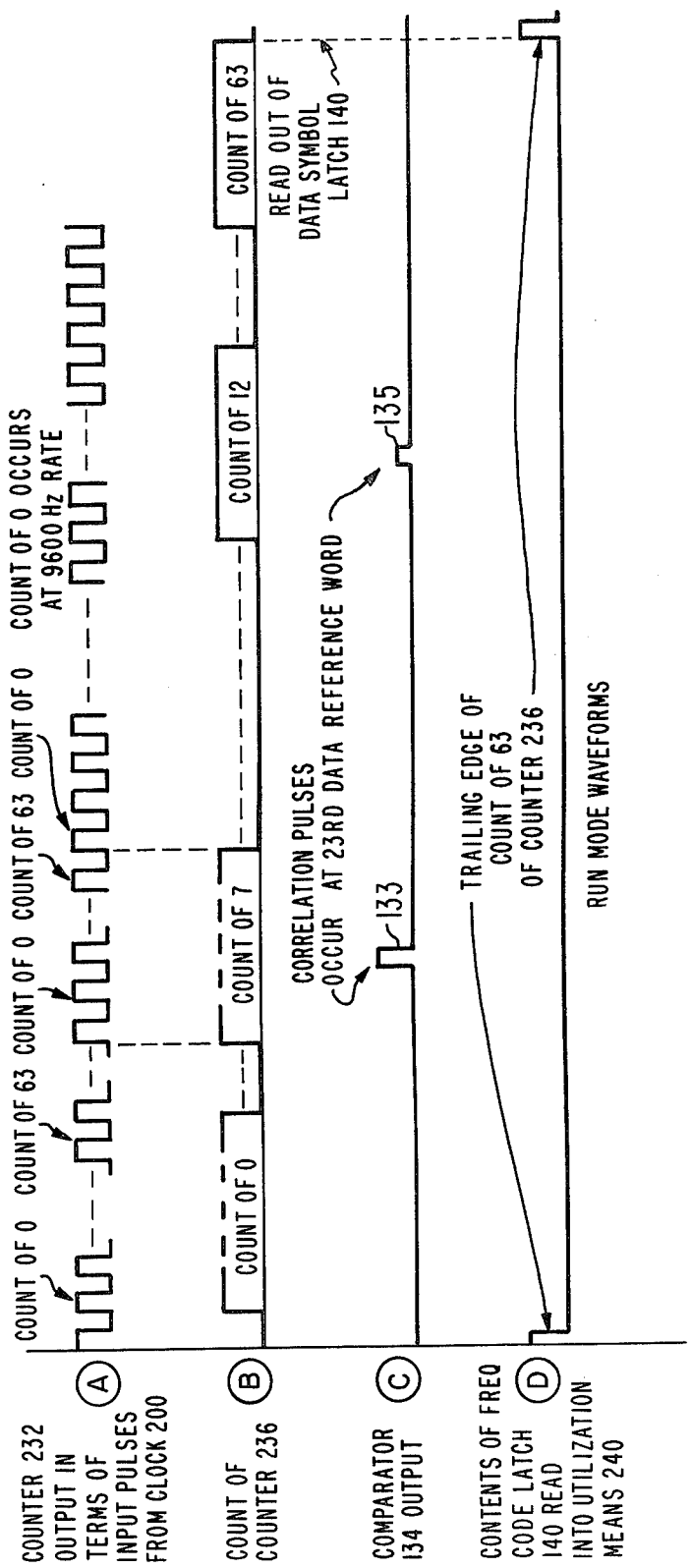
FIG. 4 is another set of timing waveforms to facilitate an understanding of the run mode of operation of the structure of FIG. 2.

For purposes of brevity the timing waveforms will be referred to herein as waveforms 3A, 3B, 3C, etc. or waveforms 4A, 4B, etc. rather than as waveform A of FIG. 3 or waveform B of FIG. 4. Further, the waveforms of FIG. 3, which represent signals at various points in the structure of FIG. 2, are identified by encircled legends in FIG. 2 which correspond to the designations of the waveforms of FIG. 3. For example, the encircled legend "3A" appearing at the output of clock source 200 of FIG. 2 and indicates that the signal represented by waveform 3A appears at that point.

In FIG. 2 the logic within dashed line block 148 corresponds to the logic within dashed line block 148 of FIG. 1. The remaining logic of FIG. 2 corresponds to the logic within the dashed line block 146 of FIG. 1 but is shown in considerably more detail. For example, the ROM 136 of FIG. 1 is, in fact, the three ROM's 230, 218 and 220 of FIG. 2 with ROM's 218 and 220 being employed in the start mode of the system, and ROM 230 being employed during the steady state or run mode. The timing portion within block 142 of FIG. 1 includes, in FIG. 2, clock source 200, divider 202, and counters 206, 204, 232 and 236. Flip-flops 216 and 226 of FIG. 2 respond to the output of counter 206 and the start pulse (waveform 3G) from start pulse source 233 to switch the system from the start mode to the operating mode. Frequency control latch 128a and latch 130 of FIG. 2 together correspond to frequency control latch 128 of FIG. 1 and data symbol latch 140 of FIG. 1 corresponds to data symbol latch 140 of FIG. 2.

Consider first the start mode of operation of the system. A start pulse 231, shown in waveform 3G, sets flip-flop 216 and resets flip-flop 226 (waveforms 3F and 3H) at time $t_0$. The setting of flip-flop 216 enables counters 204 and 206, ROMS 218 and 220 (waveform 3H), latch 130, and threshold detector 228. The resetting of flip-flop 226 at time $t_0$ in waveform 3F disables AND gates 244 and 248 and permits counters 206 and 204 to continue to run freely, as indicated in waveforms 3I, 3E, and 3D. The subsequent setting of flip-flop 226 at time $t_1$ will reset counters 206 and 204 to 0 count for purposes that will become clearer later herein.

The output from clock source 200 (waveform 3A) is divided by two in divider 202 to produce a $2^5 \times 9.6$ KHz signal (waveform 3B) which is supplied to the clock input of 0—31 count counter 204. Counter 204 will iteratively count through its 32 count capacity supplying each count of 0 (waveform 3D) to the clock input 208 of counter 206 and will also supply its actual count values to decoder 214 which will in turn supply the decoded count values to ROMS 218 and 220 to access the 32 word locations of said ROMS in successive order and supply the contents thereof, respectively, to OR gate 242 and to frequency control latch 128. The contents of the 32 word locations of ROM 218 are the 32 correction PRS codes whose patterns are similar to the predetermined received PRS code mentioned above but whose frequencies are offset by varying amounts to cover the spectrum of frequencies of any expected Doppler shift in the predetermined received PRS code. These offset frequency correction PRS codes, as mentioned above, are employed to obtain synchronization of the system in the start mode and are comprised of I and Q components. Such offset correction PRS codes are supplied through OR gate 242 to the second input terminals 251 and 253 of I and Q correlators 116 and 118.

Such 32 offset correction PRS codes are repeatedly supplied to I and Q correlators 116 and 118 during each chip period of the received PRS signal from signal source 100. This recirculation of the 32 offset correction PRS codes will continue until the predetermined received PRS code is supplied from signal source 100 to receiver 102. As the predetermined received PRS code begins to fill up the 64 stages of I and Q correlators 116 and 118 correlation pulses of increasing magnitude will be generated each time the corresponding offset correction PRS code is entered into correlators 116 and 118. The summed output of the correlation pulses, as they begin to occur, are supplied from summer 124 to A/D converter 126 and then to threshold detector 228 from summer 124. When one of such correlation pulses (waveform 3C) exceeds a certain magnitude, as determined by threshold detector 228, flip-flop 226 is set to prime AND gate 244 and also to reset counters 204 and 206 to 0. The resetting of counters 204 and 206 to 0 enables the comparison (correlation) of the 32 offset correction PRS code signals with the received PRS code during the next 64 chip periods of said incoming PRS code, thereby assuring that said 32 offset correction PRS codes will, in fact, at some point during the following 64 input chip periods, be compared with the predetermined received PRS code when it is completely entered into the I and Q correlators 116 and 118, thereby providing maximum correlation.

More specifically, after being reset to 0 counter 206 will count through its count capacity of 64 (0-63) at which time AND gate 248 will output a signal to reset flip-flop 216. Resetting flip-flop 216, as discussed above, will switch the mode of operation of the system from start to run. However, before discussing in detail what changes in logic occur during such switching of the mode of operation, the function of ROM 220, frequency control latch 128a, and latch 130 during the start mode of operation will be discussed further.

Further, after flip-flop 226 is set, AND gate 244 is primed so that when a pulse appears at the output of comparator 134 frequency control latch 128a is enabled to receive and store the contents of that memory location of ROM 220 which is being accessed at the time the pulse from comparator 134 occurs.

As discussed briefly above, the contents of the 32 memory locations of ROM 220 are values which, when supplied to local oscillator 110, will alter the frequency of said local oscillator 110 by an amount equal to the offset frequency of that correction PRS code of the corresponding word location of memory ROM 218 which is causing the output signal from comparator 134. Worded in another manner, each time a correction PRS signal accessed in ROM 218 and supplied to I and Q correlators 116 and 118 produces a correlation pulse larger than the last largest one stored in amplitude latch 132 the output signal produced by comparator 134 will enable frequency control latch 128a through AND gate 244 to supply the value in the corresponding word location of ROM 220 to control latch 128a. Thus, at the end of the 64 comparisons of the 32 offset correction PRS codes with the incoming codes from source 100, the frequency control latch 128a will contain the value supplied from ROM 220 which represents the frequency error in the received signal.

At the end of the start mode flip-flop 216 is reset as discussed above and as shown in waveforms 3J at time $t_2$. The resetting of flip-flop 216 enables latch 130 to receive and store the contents of frequency control latch 128a, thereby finally implementing the required change in frequency of local oscillator 110 to compensate for the frequency error. Resetting of flip-flop 216 also functions to disable ROM 218, enable ROM 230, and disable counters 204 and 206, and also threshold detector 228. The start mode of the system has now been completely disabled and will remain so until another start pulse 231 is supplied to the system.

Enabling of ROM 230 permits the contents of the 64 memory locations therein to be supplied through OR gate 242 to I and Q correlators 116 and 118. As discussed above, the 64 memory locations of ROM 230 contain the 64 possible received PRS codes although they are referred to as reference PRS codes herein. The count value output 0-63 of counter 232 provides addresses to the 64 word locations in ROM 230.

As indicated in the discussion of FIG. 1 the addresses of the word locations of ROM 230, which addresses are the count value output of counter 232, are, in fact the data symbols corresponding individually to the 64 reference PRS codes stored in ROM 230.

Each count of zero of counter 232 is supplied to receiver 102 and is, in fact, the 9600 Hz sample rate of the signal received from source 100. Since counter 232 has the capacity of 64 counts it is apparent that all of the 64 reference PRS codes stored in ROM 230 will be completely recirculated through correlators 116 and 118 during each chip period of the received signal from source 100.

The output of each count of counter 232 (waveform 4A) is also supplied to 0-63 counter 236 which was reset to 0 when flip-flop 216 was reset. The counter 236 will count through its capacity to the count of 63 (waveform 4B) when it will read the contents of data symbol latch 140 into utilization means 240 (waveform 4D). Since the counter 236 must count to its capacity before sending a read instruction to data symbol latch 140 the 64 reference PRS codes stored in ROM 230 will have been recirculated through I and Q correlators 116 and 118 sixty four times, once for each newly received chip of the received PRS code, thereby assuring that at some time during the 64 chip periods a newly received PRS code will be fully entered into I and Q correlators 116 and 118.

Consider now the contents of data symbol latch 140 and how such contents are determined. As discussed above, each time the output of summer 124 produces a correlation signal larger than the one stored in amplitude latch 132, the comparator 134 will detect that the newly generated correlation pulse is greater than the stored one, and will output a signal on lead 139 (waveform 4C) to cause latch 132 to store the newly generated correlation signal. Such signal on lead 139 will also cause the data symbol latch 140, when switch 153 is closed, to store the address for ROM 230 which caused the new largest correlation pulse to be generated at the output of summer 124. Thus, data symbol latch 140 will always contain the address code word for the reference PRS signal which generated the last largest correlation pulse. During any 64 chip periods the largest correlation pulses will occur each time the corresponding reference PRS code is entered into correlators 116 and 118 and as the received PRS code becomes more fully entered into correlators 116 and 118. Thus, in waveform 4C the correlation pulses 133 and 135 are caused by the 23rd reference PRS code, arbitrarily selected, each time it appears in the correlators 116 and 118.

At the end of the 64 chip periods of the received signal defined by the output of counter 236 the data symbol latch 140 will contain the 6-bit address code for the reference PRS signal which generated the largest correlation pulse during the 64 chip periods of the received signal. Then at the trailing edge of the count of 63 of counter 236 the contents of data symbol latch 140 will be supplied to utilization means 240, as shown in waveform 4D.

What is claimed is:

1. In a decoder for decoding received pseudo random sequence (PRS) codes modulated upon a carrier signal, having an original chip rate $f_c$ and an unknown frequency shift thereon, frequency compensating logic for compensating for said frequency shift to improve correlation of locally generated reference PRS codes of chip rate $f_c$ with said received PRS codes and comprising:

means including local oscillating means for demodulating said carrier signal and detecting said received PRS codes;

means for generating X correction PRS codes each having a pattern of chips similar to the chip pattern of a predetermined one of said received PRS codes and each shifted in chip rate from $f_c$ by amounts which will provide a spectrum of frequencies spanning any expected frequency shift of a received PRS code;

means for correlating each of said X correction PRS codes with a predetermined received PRS code at a rate $f_x$ to determine which particular correction PRS code produces the greatest correlation signal, where $f_x >> f_c$; and means responsive to the chip rate of said particular correction PRS code for correcting the frequency of the output of said local oscillator means to compensate for said unknown frequency shift during the reception of subsequently received PRS codes.

2. A decoder for decoding received pseudo random sequence (PRS) codes modulated upon a carrier signal, having an original chip rate $f_c$ and having an unknown frequency shift $f_d$ thereon, means for compensating for said frequency shift $f_d$ to improve correlation of a locally generated reference PRS code of chip rate $f_c$ with said received PRS code and comprising:

means for demodulating said carrier signal and generating I and Q quadrature signals of said predetermined received PRS code;

means for generating X correction PRS codes each having a pattern of chips similar to the pattern of chips of a predetermined one of said received PRS codes and shifted in chip rate from $f_c$ by amounts to provide a spectrum of frequencies spanning any expected frequency shift of the predetermined received PRS code;

means for correlating each of said X correction PRS codes with each new group of received chips each time a new chip is received and where a new group of chips is formed upon the reception of each new chip;

means for determining which particular correction PRS code produces the greatest correlation with said predetermined received PRS code; and means responsive to the determination of said particular correction code signal to offset the received PRS code by a frequency equal and opposite to the unknown frequency shift $f_d$.

3. In a decoder for decoding any one of M possible N chip pseudo random sequence (PRS) codes received serially as a stream of successive chips having an original chip rate $f_c$ and having an unknown frequency shift thereon, a method for compensating for said unknown frequency shift to enable improved correlation of locally generated reference PRS codes of chip rate $f_c$ with said received PRS code and comprising the steps of:

generating I and Q quadrature signals of said received PRS code;

generating X correction PRS codes each having a pattern of N chips similar to the pattern of chips of a predetermined one of said M possible received PRS codes and each shifted in chip rate from $f_c$ by an amount to provide a spectrum of frequencies spanning any expected frequency shift of the received PRS codes;

correlating each of said X correction PRS codes with each new group of N chips of the received serial stream of chips, and with each new group being formed by the reception of a new chip to determine which particular correction PRS code and which group of N chips provides the greatest correlation over a predetermined number of correlations; and altering the frequency of said I and Q quadrature signals in accordance with the chip rate of the determined particular correction PRS code to compensate for said unknown frequency shift.

4. In a communication system employing a transmitted PRS signal consisting of a series of M possible received pseudo random sequence (PRS) codes each consisting of a group of N chips and each of which has a frequency shift superimposed thereon when received at a receiver, a decoder for receiving and decoding such received PRS codes comprising:

first logic means comprising a local oscillator for generating I and Q quadrature components of said received PRS codes;

first generating means for generating I and Q components of X correction PRS codes each having the same pattern as a predetermined one of said M possible received PRS codes but each shifted in frequency by predetermined amounts from said predetermined received PRS code to provide a spectrum of frequencies covering the largest expected amount of frequency shift on any received PRS code;

correlation means for correlating each of said X correction PRS codes with each successive group of N chips of the received PRS code with a new group being formed upon the reception of each succeeding chip;

second logic means for detecting and identifying the specific one of said X correction PRS codes having the greatest correlation with any group of N received chips over the reception of N chips of said received PRS signal; and means responsive to the identified correction PRS code for altering the frequency of said local oscillator to compensate for the frequency shift defined by said identified correction PRS code for received PRS codes received subsequent to the alteration of the frequency of said local oscillator.

5. A decoder as in claim 4 and further comprising:

second generating means for successively generating and supplying M reference PRS codes to said correlation means for correlation with said received signal each time a new chip is received, where each of said M reference PRS codes corresponds to one of said M possible received PRS codes; and wherein said second logic means is responsive to the correlations of said M reference PRS codes and said received PRS codes to identify which reference PRS code produces the greatest correlation with each of said received PRS codes.

* * * * *